United States Patent
Perraud

(10) Patent No.: US 12,493,099 B2
(45) Date of Patent: Dec. 9, 2025

(54) METHOD OF SKIPPING UWB RANGING ROUNDS TO REDUCE THE MOBILE PHONE POWER CONSUMPTION

(71) Applicant: Qorvo US, Inc., Greensboro, NC (US)

(72) Inventor: Eric Perraud, Plaisance du Touch (FR)

(73) Assignee: Qorvo US, Inc., Greensboro, NC (US)

( * ) Notice: Subject to any disclaimer, the term of this patent is extended or adjusted under 35 U.S.C. 154(b) by 357 days.

(21) Appl. No.: 18/158,518

(22) Filed: Jan. 24, 2023

(65) Prior Publication Data
US 2023/0266431 A1    Aug. 24, 2023

Related U.S. Application Data

(60) Provisional application No. 63/311,624, filed on Feb. 18, 2022.

(51) Int. Cl.
| G01S 5/02 | (2010.01) |
| G01S 13/02 | (2006.01) |
| G01S 13/526 | (2006.01) |

(52) U.S. Cl.
CPC ........ *G01S 5/0294* (2013.01); *G01S 13/0209* (2013.01); *G01S 13/526* (2013.01)

(58) Field of Classification Search
CPC ............ C12Q 1/6858; C12Q 2525/117; C12Q 2525/121; C12Q 2525/161; C12Q 2525/186; C12Q 2561/109; G01S 13/0209; G01S 13/526; G01S 13/765; G01S 5/0294; Y02D 30/70; Y02D 10/00; Y02D 30/00
See application file for complete search history.

(56) References Cited

U.S. PATENT DOCUMENTS

| 2020/0137676 A1 | 4/2020 | Yoon et al. |
| 2021/0014677 A1 | 1/2021 | Han et al. |
| 2023/0100965 A1* | 3/2023 | Nam .................... G01S 13/765 342/146 |
| 2024/0381295 A1* | 11/2024 | Jung ..................... H04W 64/00 |

FOREIGN PATENT DOCUMENTS

WO    2021215686 A1    10/2021

OTHER PUBLICATIONS

Extended European Search Report for European Patent Application No. 23156834.6, mailed Jul. 20, 2023, 8 pages.

* cited by examiner

*Primary Examiner* — Timothy X Pham
(74) *Attorney, Agent, or Firm* — Withrow & Terranova, P.L.L.C.

(57) ABSTRACT

Systems and methods of the present disclosure are directed to a method performed by a first Ultra-Wideband (UWB)-equipped device for reducing UWB power consumption. The method includes, for a plurality of ranging rounds in accordance with a first ranging time interval, sending one or more UWB ranging signals to a second UWB-equipped device and receiving one or more location measurements from the second UWB-equipped device. A location measurement is indicative of a location of the second UWB-equipped device. The method includes, based on the one or more location measurements across the plurality of ranging rounds, modifying the first ranging time interval to a second ranging time interval different than the first ranging time interval.

19 Claims, 10 Drawing Sheets

METHOD OF SKIPPING UWB RANGING ROUNDS TO REDUCE THE MOBILE PHONE POWER CONSUMPTION

This application claims the benefit of U.S. provisional patent application Ser. No. 63/311,624, filed Feb. 18, 2022, the disclosure of which is incorporated herein by reference in its entirety.

FIELD OF THE DISCLOSURE

The present disclosure is related to Ultra-Wideband (UWB) devices, and more specifically, methods for increasing efficiency in UWB-equipped devices.

BACKGROUND

Ultra-wide-band (UWB) is a radio technology which provides UWB-equipped devices the capability to measure a precise distance (e.g., ranging) between two devices. Among other uses, UWB technologies are commonly used to secure critical wireless transactions (e.g., contactless payment, car access, home access, etc.). For example, UWB sensors allow smartphones and other wireless devices to safely and accurately provide remote keyless entry to vehicles, or to homes.

To calculate the distance between UWB-equipped devices, some conventional UWB approaches use single-side two-way ranging (SS-TWR). FIG. 1 is a data flow diagram that illustrates a conventional SS-TWR method for UWB-equipped devices. As illustrated, SS-TWR measures a time-of-flight (TOF) computation which considers the time delta Tround between an initiation message and a response message at a ranging initiator device and a time delta for Treply at the ranging responder for receiving the initiation message and providing the response message. Specifically, under SS-TWR, the TOF may be calculated as $$TOF = \frac{T_{round} - T_{reply}}{2}.$$

The TOF is then utilized to determine the distance between the two devices.

Alternatively, other conventional UWB approaches utilize dual-side two-way ranging (DS-TWR). FIG. 2 is a data flow diagram that illustrates a conventional DS-TWR method for UWB-equipped devices. DS-TWR measures time deltas between initiation and reception of messages at both the initiator device and responder device. In the example illustrated in FIG. 2, the TOF can be calculated as $$\frac{(T_{round1} * T_{round2}) - (T_{reply1} * T_{reply2})}{T_{round1} + T_{round2} + T_{reply1} + T_{reply2}}.$$

It should be noted that, unlike SS-TWR, DS-TWR ranging is not sensitive to the clock offset between both devices.

In parallel to determining the distance between devices, a UWB-equipped device may also use a received UWB signal to measure an angle of arrival of the signal. In turn, this measured angle of arrival may be used to calculate an elevation of a transmitting device with respect to the receiving device.

As illustrated, UWB implementations employ either SS-TWR or DS-TWR to measure a ranging and/or difference in elevation between UWB-equipped devices. However, to facilitate UWB use-cases (e.g., remote car unlocking, etc.), a UWB-equipped device must constantly measure its distance from other UWB-equipped devices in accordance with a ranging time interval. In conventional approaches, this ranging time interval is a pre-set static interval.

SUMMARY

One example embodiment of the present disclosure is directed to an Ultra-Wideband (UWB)-equipped device with reduced UWB power consumption. The UWB-equipped device includes one or more UWB transmitters. The UWB-equipped device includes one or more UWB receivers. The UWB-equipped device includes processing circuitry. The processing circuitry is configured to cause the UWB-equipped device to, for a plurality of ranging rounds in accordance with a first ranging time interval, send one or more UWB ranging signals to a second UWB-equipped device, and receive one or more location measurements from the second UWB-equipped device. A location measurement is indicative of a location of the second UWB-equipped device. The processing circuitry is configured to cause the UWB-equipped device to, based on the one or more location measurements across the plurality of ranging rounds, modify the first ranging time interval to a second ranging time interval different than the first ranging time interval.

Another example embodiment of the present disclosure is directed to a UWB-equipped device with reduced UWB power consumption. The UWB-equipped device is adapted to, for a plurality of ranging rounds in accordance with a first ranging time interval, send one or more UWB ranging signals to a second UWB-equipped device, and receive one or more location measurements from the second UWB-equipped device. A location measurement is indicative of a location of the second UWB-equipped device. The UWB-equipped device is adapted to cause the UWB-equipped device to, based on the one or more location measurements across the plurality of ranging rounds, modify the first ranging time interval to a second ranging time interval different than the first ranging time interval.

Another example embodiment of the present disclosure is directed to a method performed by a first UWB-equipped device for reducing UWB power consumption. The method includes, for a plurality of ranging rounds in accordance with a first ranging time interval, sending one or more UWB ranging signals to a second UWB-equipped device, and receiving one or more location measurements from the second UWB-equipped device. A location measurement is indicative of a location of the second UWB-equipped device. The method includes, based on the one or more location measurements across the plurality of ranging rounds, modifying the first ranging time interval to a second ranging time interval different than the first ranging time interval.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 9:
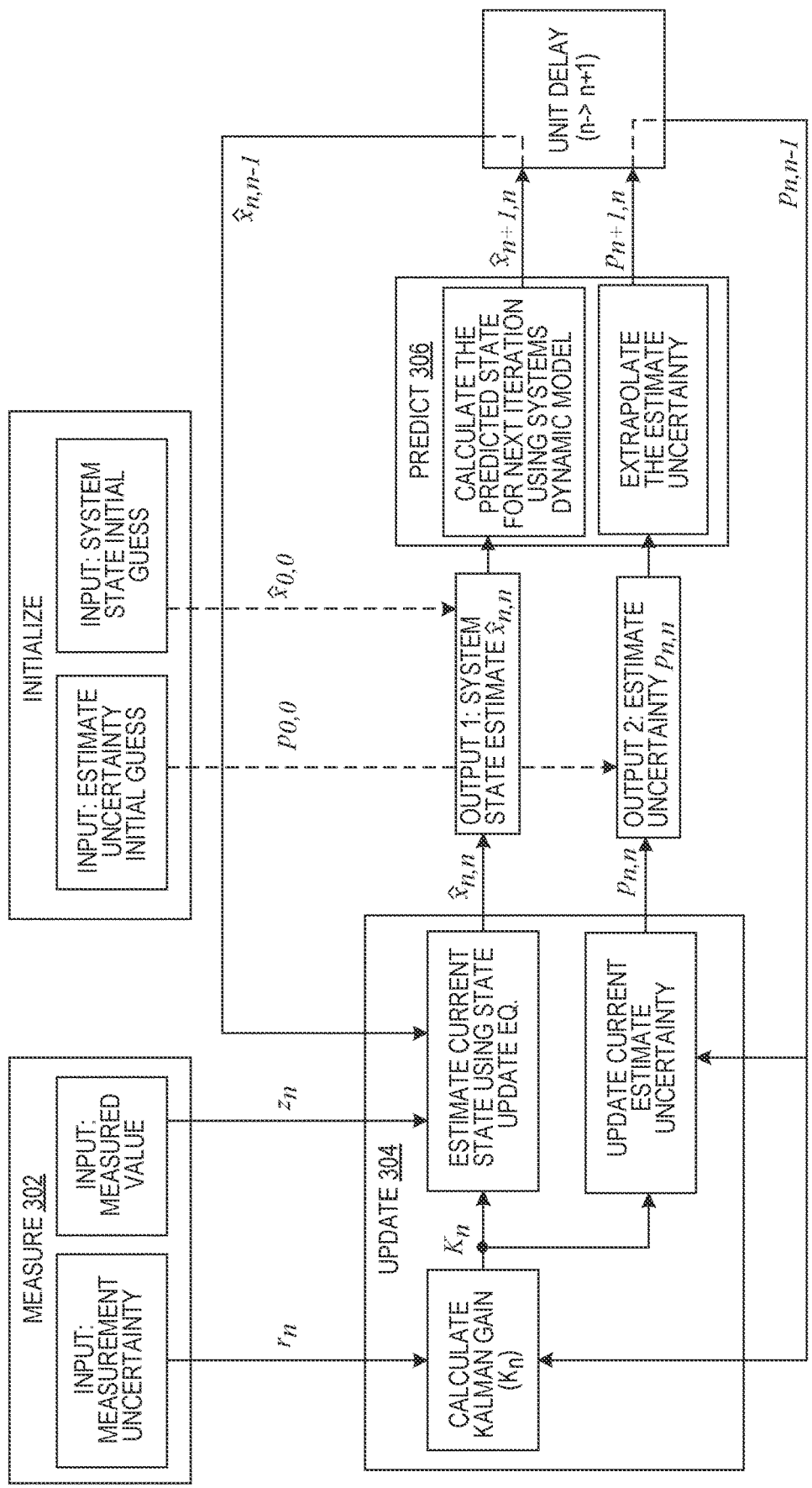
Figure 10:
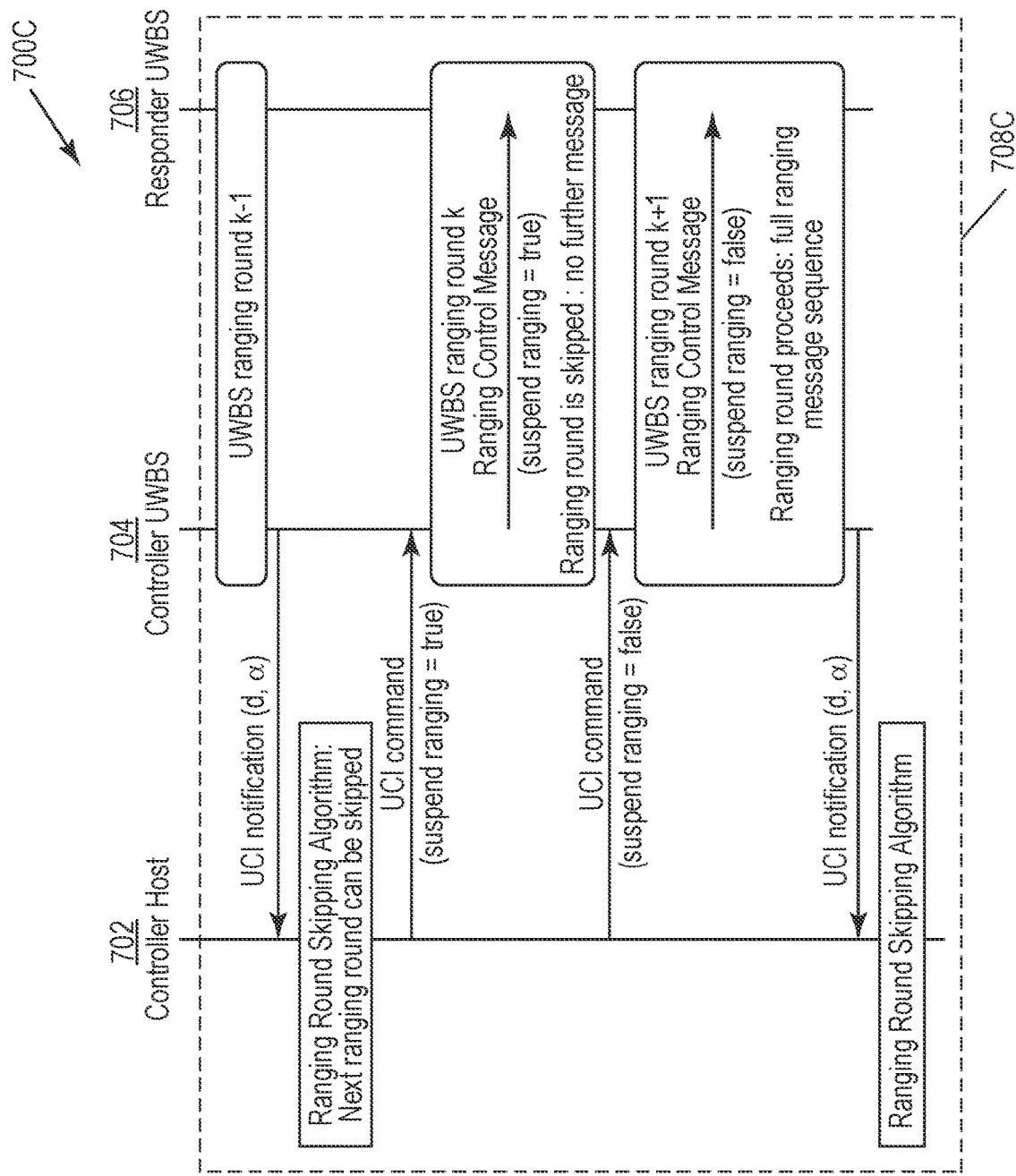

FIG. 9 illustrates a block diagram for a Kalman filter predictive technique for determining and end location or angle for a UWB-equipped device according to some embodiments of the present disclosure; and FIG. 10 is a data flow diagram that illustrates communication between a controller host utilizing a ranging round skipping algorithm and a controller UWB-equipped device that predicts an end location of a responding UWB-equipped device according to yet another embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Conventional Ultra-Wideband (UWB) approaches can be used to determine the distance and/or elevation between UWB-equipped devices. It should be noted that a "UWB-equipped device" can be any device with UWB capabilities. More specifically, a UWB-equipped device may describe a UWB sensor capable of both transmitting and receiving a UWB signal, or may describe a device with a passive UWB sensor, or a standalone passive UWB sensor, that is capable of passively reflecting any broadcasted UWB sensors.

As described previously, conventional UWB approaches instruct a UWB-equipped device to constantly measure its distance from other UWB-equipped devices in accordance with a static, pre-set ranging time interval. However, in the aggregate, UWB ranging time intervals can consume a significant amount of power and/or other resources (e.g., computational cycles, etc.). Furthermore, there are many circumstances in which a static ranging time interval is unnecessary. As an example, a user may use a UWB-equipped smartphone for remote unlocking of a UWB-equipped vehicle. The vehicle is parked at the user's home and the user's smartphone is located within the home. In this scenario, the UWB-equipped vehicle will detect the smartphone and initiate a ranging procedure with the smartphone. Because the smartphone and the vehicle are unmoving, the vehicle will endlessly transmit the UWB ranging procedure at the preset static ranging time interval, therefore unnecessarily consuming significant amounts of power and other resources. Additionally, on top of the UWBS power, there is also significant power consumption from any processor(s) of the UWB-equipped device(s) used to process a ranging result. For example, the power consumption penalty of an application processor wake-up for ranging processing can be significant in conventional processors.

Accordingly, embodiments of the present disclosure propose a method for reducing power consumption in UWB-equipped devices. Specifically, a ranging round skipping function is proposed that can be invoked when a UWB-equipped device sends a measurement notification to a host (e.g., via a UWB sensor, etc.).

Aspects of the present embodiments provide a number of technical effects and benefits. In one example technical effect and benefit, the proposed embodiments substantially reduces the number of unnecessary ranging rounds in UWB-equipped devices, therefore significantly reducing power consumption and increasing battery life. For example, by setting a max ranging sampling period at 4× an initial ranging period, the ranging power penalty is divided roughly by 4 if the responder is static or quasi-static to the sender. In example technical effect and benefit, some embodiments of the present disclosure allow for prediction of movement patterns of receiving UWB-equipped devices, therefore increasing the accuracy and efficiency of transmitting UWB-equipped devices.

Figure 1:
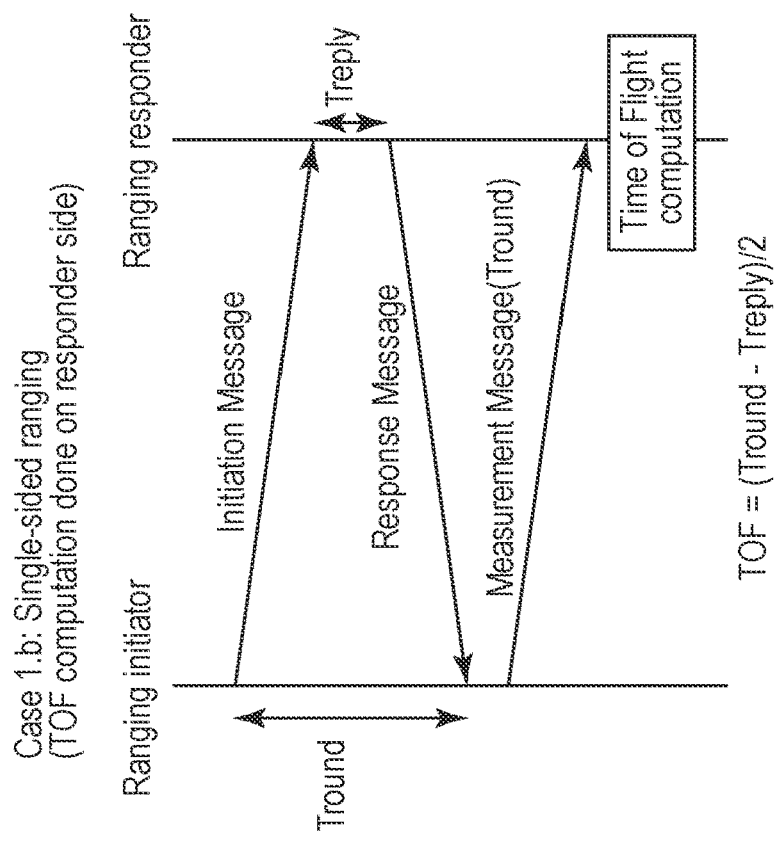
FIG. 1 is a data flow diagram that illustrates a conventional Single-Side Two Way Ranging (SS-TWR) method for Ultra-WideBand (UWB)-equipped devices.
Figure 1:
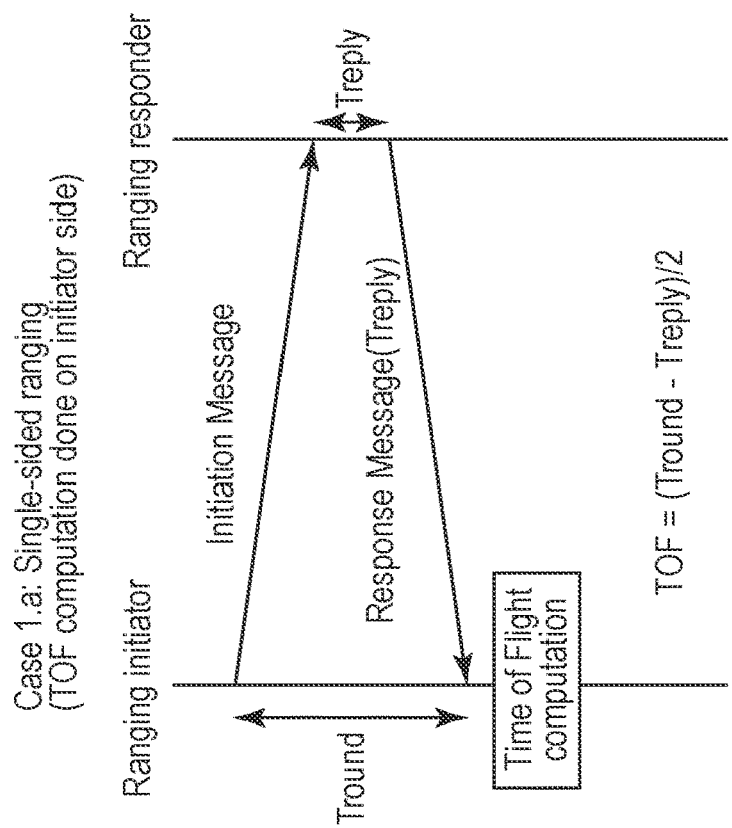
Figure 2:
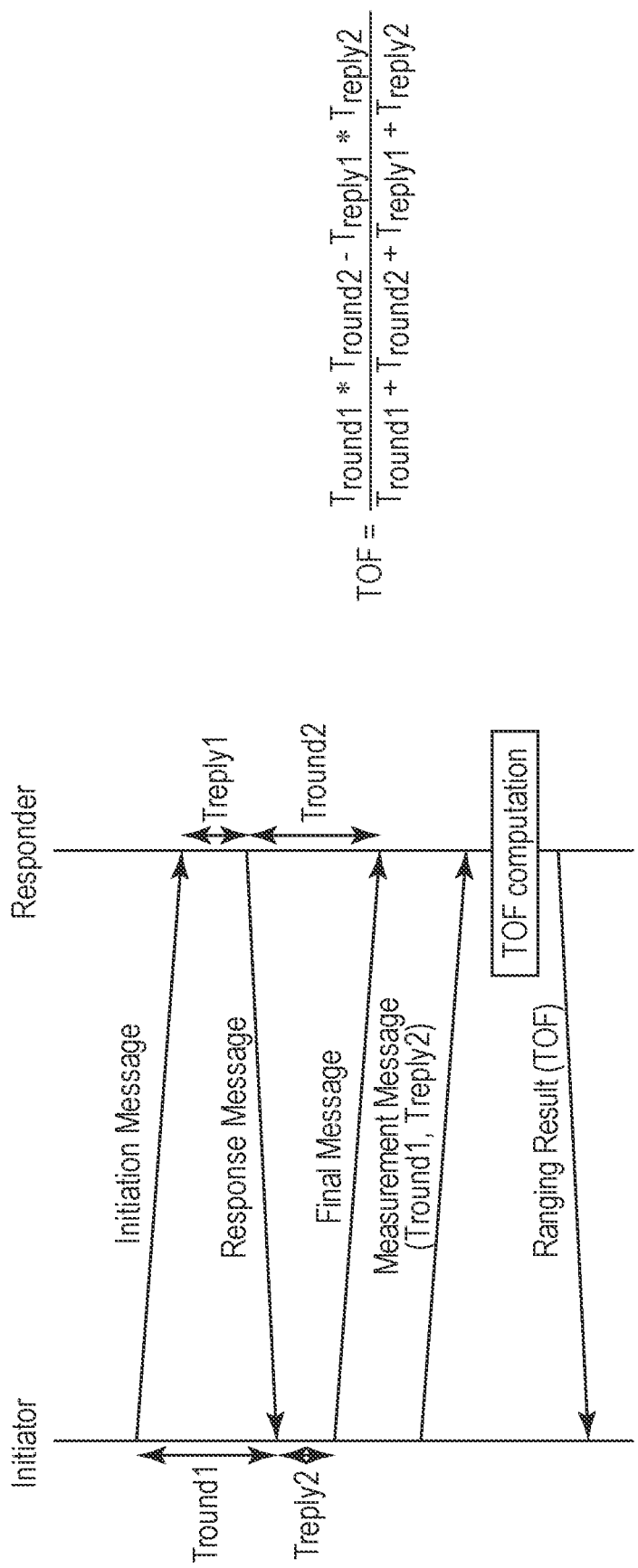
FIG. 2 is a data flow diagram that illustrates a conventional Dual Side (DS)-TWR method for UWB-equipped devices.
Figure 3:
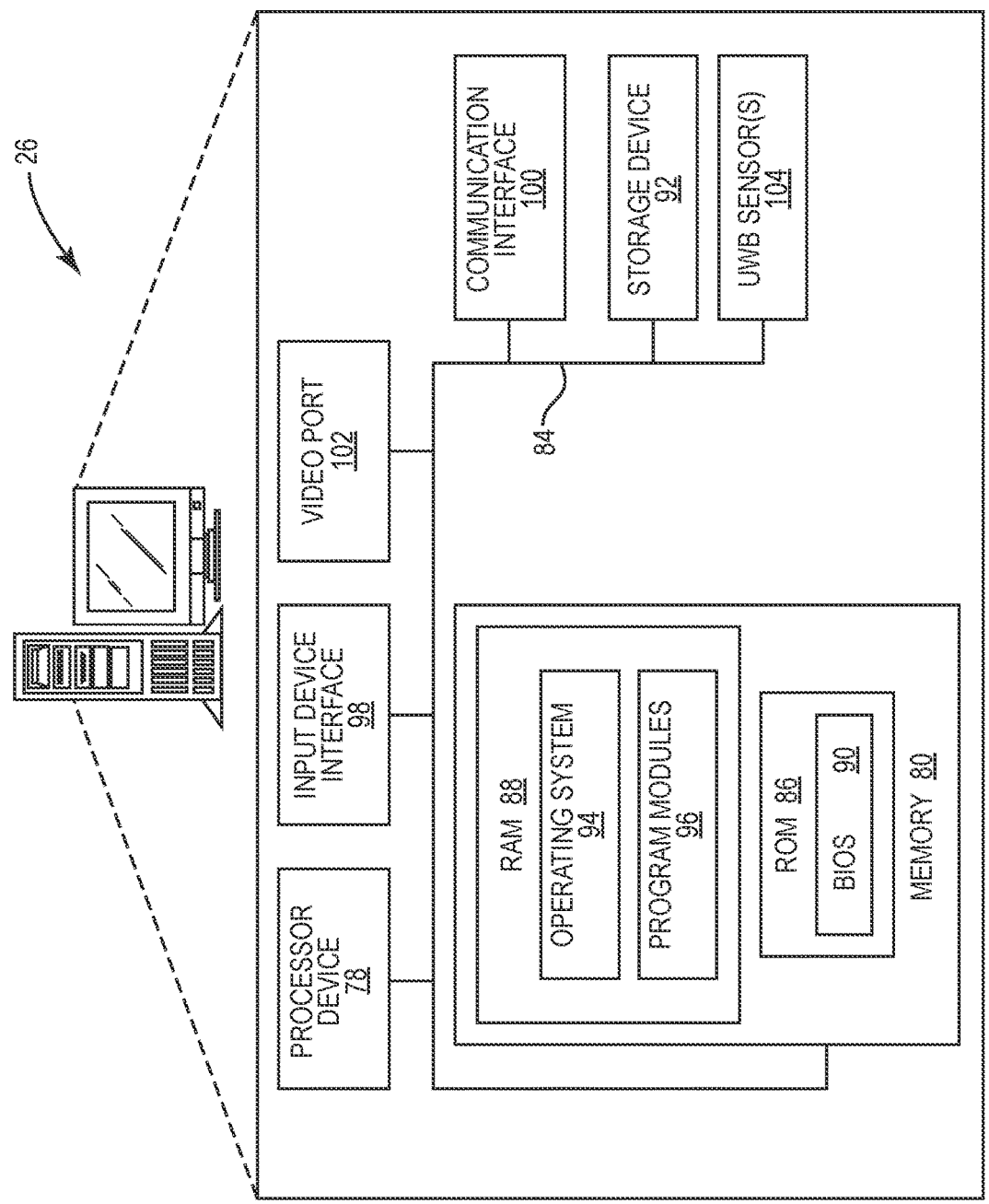
FIG. 3 is a block diagram of a data manager suitable for implementing examples according to some embodiments of the present disclosure.

FIG. 3 is a block diagram of the data manager 26 suitable for implementing examples according to one example. The data manager 26 may comprise any computing or electronic device capable of including firmware, hardware, and/or executing software instructions to implement the functionality described herein, such as a computer server, a desktop computing device, a laptop computing device, a smartphone, a computing tablet, or the like. The data manager 26 includes the processor device 78, the system memory 80, and a system bus 84. The system memory 80 may include non-volatile memory 86 and volatile memory 88. The non-volatile memory 86 may include read-only memory (ROM), erasable programmable read-only memory (EPROM), electrically erasable programmable read-only memory (EEPROM), and the like. The volatile memory 88 generally includes random-access memory (RAM)). A basic input/output system (BIOS) 90 may be stored in the non-volatile memory 86 and can include the basic routines that help to transfer information between elements within the data manager 26.

It should be noted that the data manager 26 may be or otherwise represent a "UWB-equipped device" as described with regards to the present embodiments. Specifically, a UWB-equipped device may be defined as a data manager (e.g., data manager 26) that includes or is otherwise in communication with UWB sensor(s) (e.g., UWB sensor(s) 104. However, "UWB-equipped devices", as defined in the present disclosure, are not limited to devices or data managers that include each, or any, of the components of data manager 26. Rather, a UWB-equipped device should be understood to broadly include any UWB sensor(s) (e.g., a standalone passively reflective UWB sensor, etc.), or any device, component, system, or architecture that includes or otherwise communicates with UWB sensor(s).

The system bus 84 provides an interface for system components including, but not limited to, the system memory 80 and the processor device 78. The system bus 84 may be any of several types of bus structures that may further interconnect to a memory bus (with or without a memory controller), a peripheral bus, and/or a local bus using any of a variety of commercially available bus architectures. The processor device 78 can be any commercially available or proprietary processor, central processing unit (CPU), microcontroller, or the like.

The data manager 26 may include, be coupled to, or otherwise receive inputs from UWB sensor(s) 104. For example, the data manager 26 may be a smartphone device with one or more UWB sensors 104 connected to the system bus 84. For another example, the data manager 26 may be a computing device that receives data (e.g., via a wired or wireless connection) from an external UWB sensor. For yet another example, the data manager 26 may be a computing device within a computing system/architecture/network that includes UWB sensor(s) 104. As such, it should be generally understood that the data manager 26 and the UWB sensor(s) 104 may broadly constitute a "UWB-equipped device" in any manner.

The data manager 26 may further include or be coupled to a non-transitory computer-readable storage medium, such as the storage device 92, which may represent an internal or external hard disk drive (HDD), flash memory, or the like. The storage device 92 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 94 and any number of applications 96 can be stored in the volatile memory 88, wherein the applications 96 represent a wide array of computer-executable instructions corresponding to programs, applications, functions, and the like that may implement the functionality described herein in whole or in part. The applications 96 may also reside on the storage mechanism provided by the storage device 92. As such, all or a portion of the functionality described herein may be implemented as a computer program product stored on a transitory or non-transitory computer-usable or computer-readable storage medium, such as the storage device 92, volatile memory 88, non-volatile memory 86, and the like. The computer program product includes complex programming instructions, such as complex computer-readable program code, to cause the processor device 78 to carry out the steps necessary to implement the functions described herein. The processor device 78, may serve as a controller or control system for the data manager 26 to implement the functionality described herein based on the computer program product.

An operator, such as the user, may also be able to enter one or more configuration commands through a keyboard, a pointing device such as a mouse, or a touch-sensitive surface, such as the display device, via an input device interface 98 or remotely through a web interface, terminal program, or the like via a communication interface 100. The display device, which is coupled to the system bus 84, may be driven via a video port 102. The communication interface 100 may be wired or wireless and facilitate communications with any number of devices via the communication network 22, border router 20, lighting fixtures 14, wall controller 12, user devices 30, and/or UWB sensor(s) 104 in a direct or indirect fashion.

Figure 4:
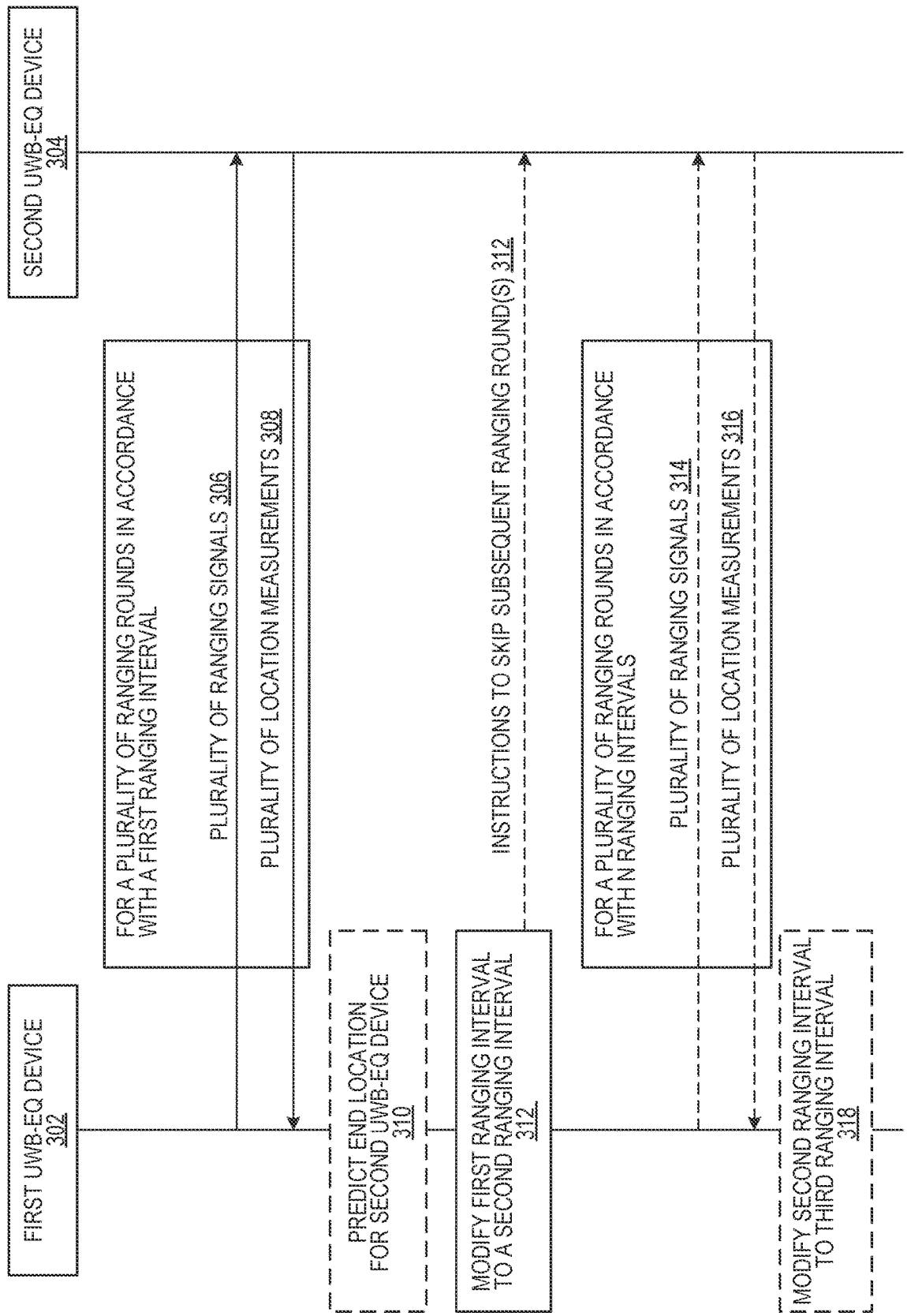
FIG. 4 is a data flow diagram for communication between a first UWB-equipped device and a second UWB-equipped device according to some embodiments of the present disclosure.

FIG. 4 is a data flow diagram for communication between a first UWB-equipped device 302 and a second UWB-equipped device 304 according to some embodiments of the present disclosure. As illustrated, boxes and lines with a dashed line indicate steps that are optional.

The first UWB-equipped device 302 may initiate ranging rounds with the second UWB-equipped device 304. Specifically, at step 306, the first UWB-equipped device 302 may send one or more UWB ranging signals to the second UWB-equipped device 304 for each of a plurality of ranging rounds in accordance with a first ranging time interval. As an example, for each of the plurality of ranging rounds, the first UWB-equipped device 302 may send and receive one or more ranging signals in each of the plurality of ranging rounds in accordance with a ranging time interval of T.

In some embodiments, a location measurement may include a distance between the first UWB-equipped device 302 and the second UWB equipped device 304, an angle between the first UWB-equipped device 302 and the second UWB equipped device 304, and/or sensor data from one or more sensors of the second UWB-equipped device 304 that is descriptive of a location of the second UWB-equipped device 304 or movement of the second UWB-equipped device 304.

More generally, in some embodiments the location measurement(s) include a list of distances between the controller and responders, a list of angles of arrival between the controller and the responders, or a tuple that includes both the distance and angle between controllers and responders.

At step 308, the second UWB-equipped device 304 receives the one or more UWB ranging signals and returns one or more location measurements for each of the plurality of ranging rounds in accordance with the first ranging time interval. To follow the previously described example, the second UWB-equipped device 304 may receive one or more ranging signals and send one or more location measurements in accordance with the first ranging time interval.

It should be noted that, although embodiments of the present disclosure are described with regards to a single responding device (e.g., the second UWB-equipped device 304), the proposed embodiments may be utilized for any number of UWB-equipped devices.

Figure 5:
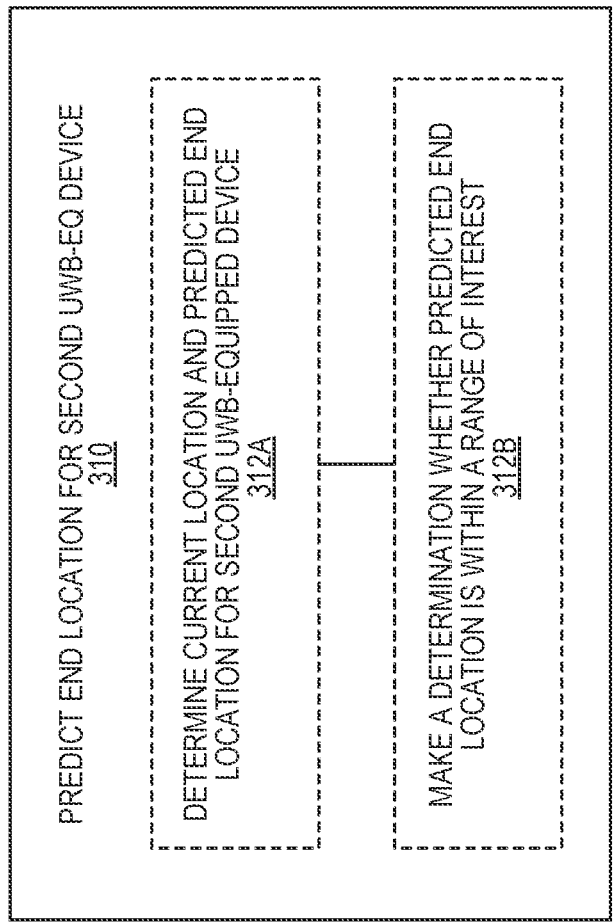
FIG. 5 is a flowchart for predicting an end location for a UWB-equipped device according to some embodiments of the present disclosure.

In some embodiments, the first UWB-equipped device 302 may predict an end location for the second UWB-equipped device 304. Turning to FIG. 5, FIG. 5 is a flowchart for predicting an end location for a UWB-equipped device according to some embodiments of the present disclosure. Specifically, at step 310A, in some embodiments, the first UWB-equipped device 302 determines a current location and a predicted end location for the second UWB-equipped device based on the one or more location measurements received across the plurality of ranging rounds at step 308. In some embodiments, to determine the current location and predicted end location at step 308, the first UWB-equipped device 302 generates, using one or more predictive techniques, data indicative of the predicted end location for the second UWB-equipped device based on the location measurements across the plurality of ranging rounds. The predicted techniques used by the first UWB-equipped device 302 may be or otherwise include any sort of predictive technique or method. As an example, the predictive technique(s) may be or otherwise include a Kalman filter. As another example, the predicted technique(s) may be a machine-learned model trained to predict an end location for a UWB-equipped device based on location measurements received from the UWB-equipped device.

Following this example, to generate the data indicative of the predicted end location for the second UWB-equipped device 304, the first UWB-equipped device 302 can process the one or more location measurements for each of the plurality of ranging rounds with a machine-learned location prediction model to obtain the data indicative of the predicted end location for the second UWB-equipped device. The machine-learned location prediction model may be or otherwise utilize any sort of model architecture or learning techniques (e.g., reinforcement learning model(s), neural network(s), transformer model(s), regression model(s), etc.).

In some embodiments, to generate the data indicative of the predicted end location for the second UWB-equipped device 304, the first UWB-equipped device 302 may process the one or more location measurements for each of the plurality of ranging rounds alongside historical device data with the machine-learned location prediction model. In some embodiments, the historical device data may be location measurement data that has been collected from the second UWB-equipped device 304 in prior ranging round (s). Additionally, or alternatively, in some embodiments, the historical device data may describe various historical aspects of the second UWB-equipped device 304 (e.g., a device type, previously predicted, end locations, previously determined movement patterns, etc.). As an example, the historical device data may indicate that the second UWB-equipped device 304 historically stays stationary between 9 a.m. and 5 p.m. on certain days of the week, or that the second UWB-equipped device is historically stationary between 3 a.m. and 8 a.m. every night of the week. As such, it should be understood that the historical user data may describe or otherwise indicate any prior or current aspects of the second UWB-equipped device 304.

At step 310B, in some embodiments, the first UWB-equipped device 302 makes a determination whether the predicted end location is within a range of interest. The range of interest may be a preset, static range that is configurable for the first UWB-equipped device 302. For example, the range of interest may be a radius of 25 feet around the first UWB-equipped device 302. Alternatively, in some embodiments, the range of interest for the first UWB-equipped device 302 may be dynamically determined based on various factors or aspects of the first UWB-equipped device 302 and/or the second UWB-equipped device 304. For example, the range of interest for the first UWB-equipped device 302 may be dynamically adjusted based on the time of day, the day of the week, a remaining power level for the first and/or second UWB-equipped devices 302/304, a current and/or predicted processing load of the first and/or second UWB-equipped devices 302/304, etc.

In such fashion, the first UWB-equipped device 302 can utilize dynamic adjust of its range of interest as a method to reduce or increase ranging rounds, therefore reducing inefficient ranging round utilization and increasing efficiency and battery performance for the first and/or second first UWB-equipped devices 302/304.

Returning to FIG. 4, at step 312, the first UWB-equipped device 302, based on the one or more of location measurements, modifies the first ranging time interval to a second ranging time interval different than the first ranging time interval. For example, the one or more location measurements across the plurality of ranging rounds may indicate that the variance in location for the second UWB-equipped device 304 over time is under a threshold level (e.g., relatively little movement of the device). Based on the measurements, the first UWB-equipped device 302 may reduce (e.g., modify) the first ranging time interval to a second ranging time interval less than the first ranging time interval. Specifically, by reducing the first ranging time interval to the second ranging time interval, the UWB-equipped device 302 performs fewer ranging rounds when performing ranging rounds in accordance with the second ranging time interval.

In some embodiments, to modify the first ranging time interval to the second ranging time interval, the first UWB-equipped device sends, to the second UWB-equipped device 304, data indicative of instructions to skip one or more of a plurality of subsequent ranging rounds in accordance with the second ranging time interval (e.g., perform fewer ranging rounds). In some embodiments, the data indicates instructions that the second UWB-equipped device 304 ignore one or more received ranging signals. Alternatively, in some embodiments, the second UWB-equipped device 304 stores data that indicates an expected number of ranging signals (e.g., data indicative of the first ranging time interval), and the data is indicative of instructions to modify the expected number of ranging signals in accordance with the second ranging time interval.

In some embodiments, to modify the first ranging time interval to the second ranging time interval at step 312, the first UWB-equipped device 302 determines a degree of movement of the second UWB-equipped device 304 between the one or more location measurements across the plurality of ranging rounds. Based on the degree of movement, the first UWB-equipped device 312 modifies the first ranging time interval to the second ranging time interval. As an example, the first UWB-equipped device 302 may determine that the degree of movement is less than a threshold degree of movement. To modify the first ranging time interval, the first UWB-equipped device 302 modifies the first ranging time interval to a second ranging time interval less than the first ranging time interval. As another example, the first UWB-equipped device 302 may determine that the degree of movement is greater than a threshold degree of movement. To modify the first ranging time interval, the first UWB-equipped device 302 modifies the first ranging time interval to a second ranging time interval greater than or equal to the first ranging time interval.

To provide a specific example of the described embodiments, let d represent distance and a represent angle of arrival. The first UWB-equipped device 302 may invoke a Ranging Round Skipping (RRS) function to send and receive the ranging signals and location measurements at steps 306/308. There may be two types of RRS functions: 1) a function in which the RRS checks if the responder is static in the controller referential, and 2) a function in which the RRS tries to predict whether the responder is at a distance or at angle which is of interest for the application.

For the example of RRS function 1, the RRS checks whether $\|d_n-d_k\|<\Delta$, for n=k+1 . . . . X, meaning that the distance of the responding device has not changed more than $\Delta$, for X consecutive measurements. Additionally, or alternatively, the RRS may check whether $\|a_n-a_k\|<\Phi$, for n= k+1 . . . . X, meaning that the angle of the responding device has not changed more than $\Phi$, for X consecutive measurements.

In some embodiments, the type of condition evaluated depends on the application. The thresholds $\Delta$ and $\Phi$ and the number of consecutive measurements being considered depend also on the application. If such a criteria is met, for example, the first UWB-equipped device (e.g., the controller host) may decide to increase the ranging time interval. As an example, if the ranging with the second UWB-equipped device (e.g., the responder) is within the ranging resolution (about 10 to 20 cm) for X consecutive measurements, the controller can decide to measure the distance at a sampling period=2*T (T being the initial ranging time interval). If the next X measurements (done at 2*T sampling period) still report that the remote device has not moved (or not significantly), the controller host may again decide to double the ranging time interval (=4*T) . . . while it is less than the max interval.

Figure 6:
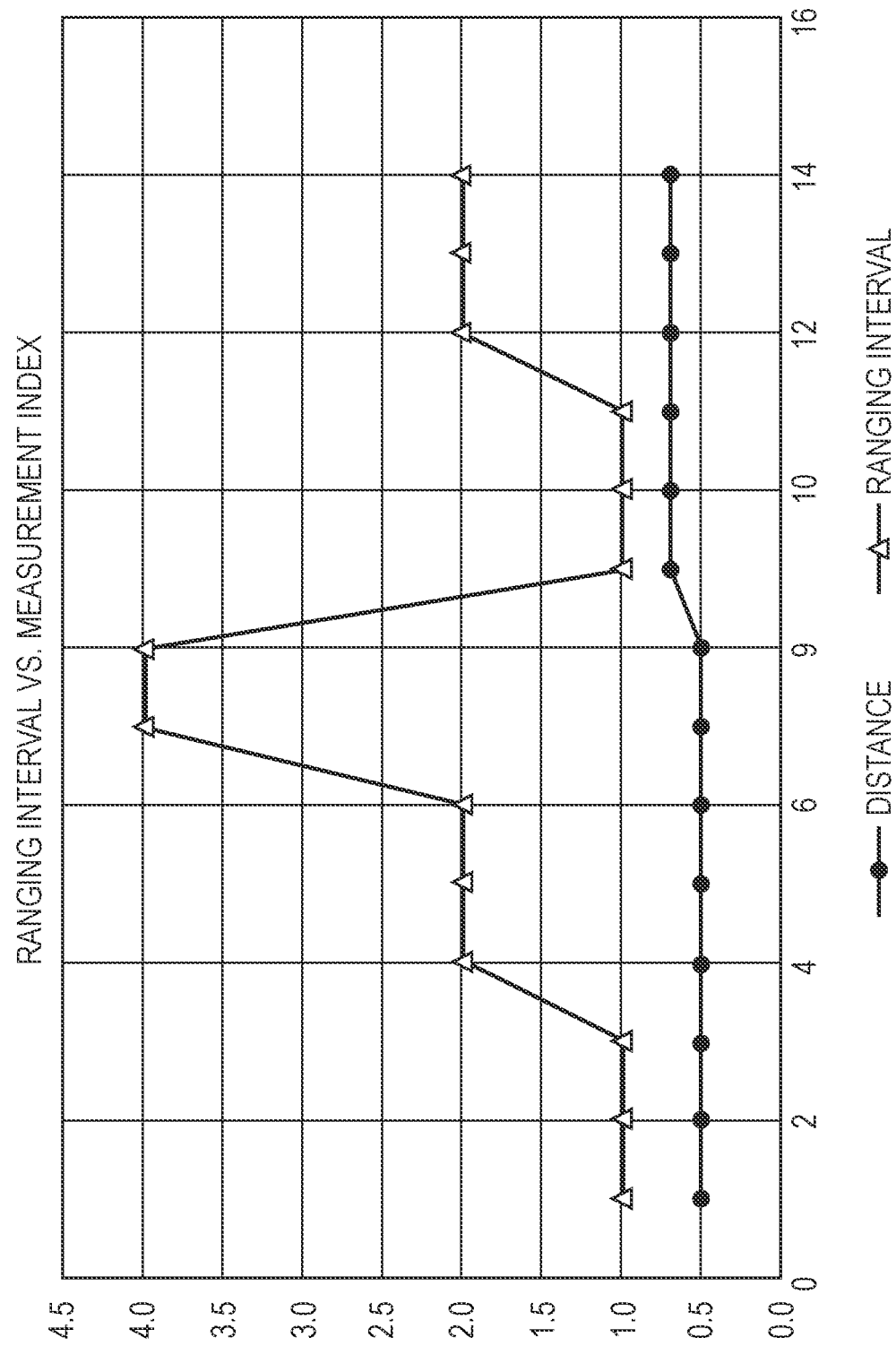
FIG. 6 is a chart that illustrates a UWB-equipped device restoring an initial ranging time interval after determining that the device has moved more than a threshold, or the devices angle has changed more than a threshold according to some embodiments of the present disclosure.

Turning to FIG. 6, FIG. 6 is a chart 600 that illustrates a UWB-equipped device restoring an initial ranging time interval after determining that the device has moved more than a threshold or the devices angle has changed more than a threshold according to some embodiments of the present disclosure. Specifically, as illustrated in chart 600, if a responder UWB-equipped device does not move for 8 consecutive measurements (3 being done at interval=T, 3 done at interval=2*T, 2 done at interval=4*T); but at the 9th measurement, it moves more than a threshold, the host restores the initial ranging time interval.

Returning to FIG. 4, At step 314, in some embodiments, the first UWB-equipped device 302 sends one or more second UWB ranging signals to the second UWB-equipped device 304 for a second plurality of ranging rounds in accordance with the second ranging time interval, and receives one or more second location measurements from the second UWB-equipped device 304.

At step 318, in some embodiments, based on the one or more second location measurements, the first UWB-equipped device 302 modifies the second ranging time interval to a third ranging time interval different than the second ranging time interval. In some embodiments, the third ranging time interval is equal to the first ranging time interval.

Figure 7:
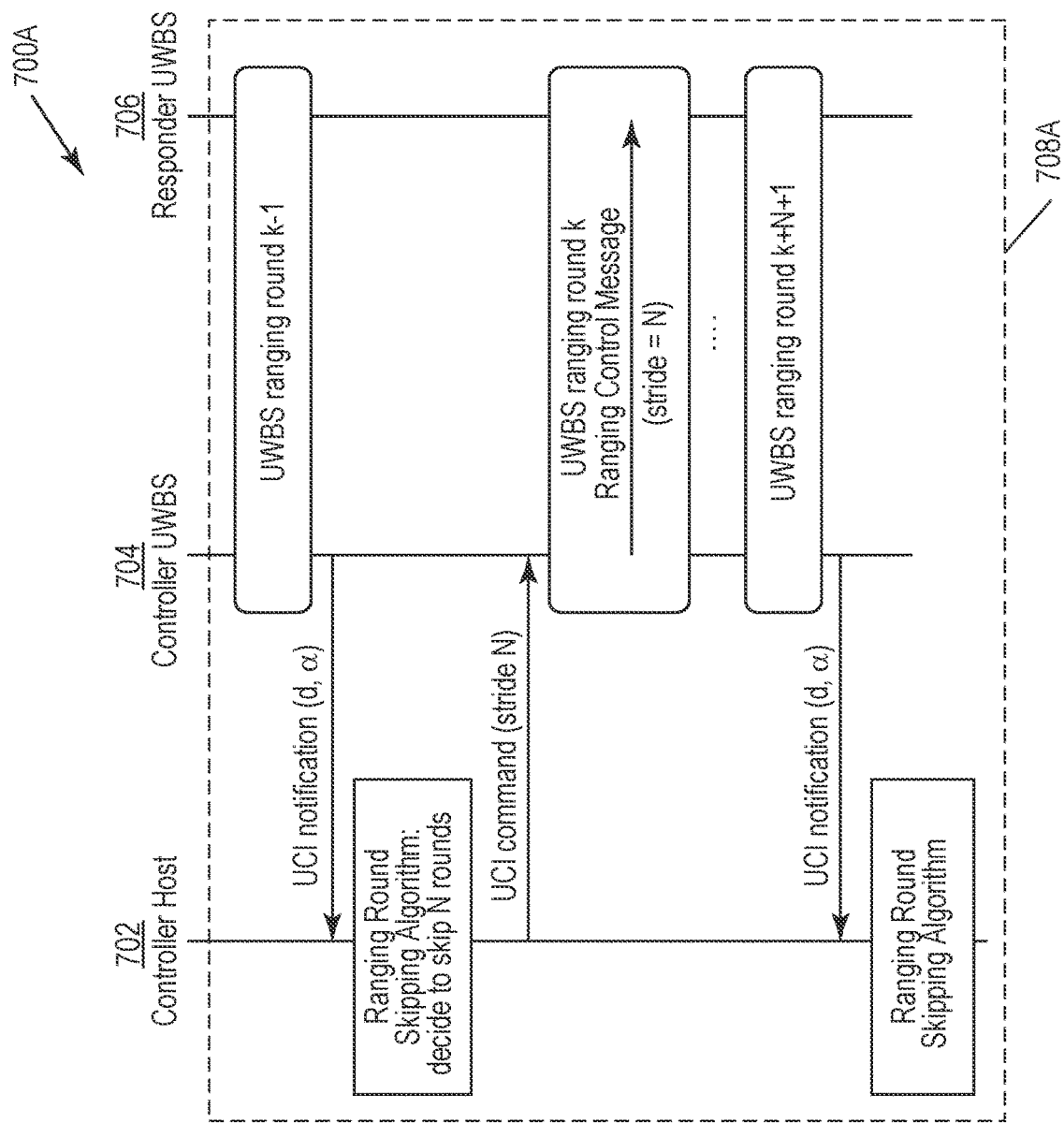
FIG. 7 is a data flow diagram that illustrates communication between a controller host utilizing a ranging round skipping algorithm and a controller UWB-equipped device according to one embodiment of the present disclosure.

FIG. 7 is a data flow diagram 700A that illustrates communication between a controller host utilizing a ranging round skipping algorithm and a controller UWB-equipped device according to one embodiment of the present disclosure. Specifically, as described previously, a RRS algorithm may be utilized to determine whether to skip ranging rounds.

The RRS algorithm is responsible to decide whether ranging rounds should be skipped and how many can be skipped. In some embodiments, the RRS algorithm may be executed on a UWB-equipped device (e.g., the first device 302 of FIG. 4). However, in some other embodiments, the RRS algorithm may be executed on a controller host (e.g., controller host 702), and the results of the algorithm may be communicated to the controller UWB-equipped device 704. It should be noted that the controller host 702 may be or otherwise include any servers, systems, architectures, or devices (e.g., network servers, etc.). Specifically, in some embodiments, the controller host 702 is a component of the controller UWB-equipped device 704, or is communicatively coupled to the controller UWB-equipped device 704.

The flowchart 700A illustrates a series of ranging rounds 708A in accordance with a ranging round skipping algorithm that can modify the ranging time interval.

Round 0 of the ranging rounds 708A is a regular ranging round. The distance has not changed for N consecutive measurements. The RRS algorithm determines to double the ranging time interval (to 2*T) and resets the counter of consecutive measurements in which the responding UWB-equipped device 706 has not moved.

Ranging round 1 of the ranging rounds 708A is a regular ranging round. The controller UWB-equipped device 704 modifies the ranging time interval to a ranging time interval less than the previous interval. Specifically, the controller UWB-equipped device 704 modifies the ranging time interval by setting Stride=2 in the Ranging Control Message to inform the responding UWB-equipped device 706 that the next 2 rounds can be skipped.

In accordance with the modified ranging time interval, ranging rounds 2 and 3 of the ranging rounds 708A are skipped.

Ranging round 4 of the ranging rounds 708A is a regular ranging round. The distance has not changed. The RRS algorithm increments the counter of consecutive measurements with movement from the responder UWB-equipped device 706. Since the counter is less than N, the distance is still measured.

Round 5 of the ranging rounds 708A is a regular ranging round. To again modify the ranging time interval, the controller UWB-equipped device sets Stride=2 in the Ranging Control Message (RCM) to inform the responding UWB-equipped device 706 that the next 2 rounds can be skipped.

Although not depicted, rounds 6 and 7 of the ranging rounds 708A are skipped.

Figure 8:
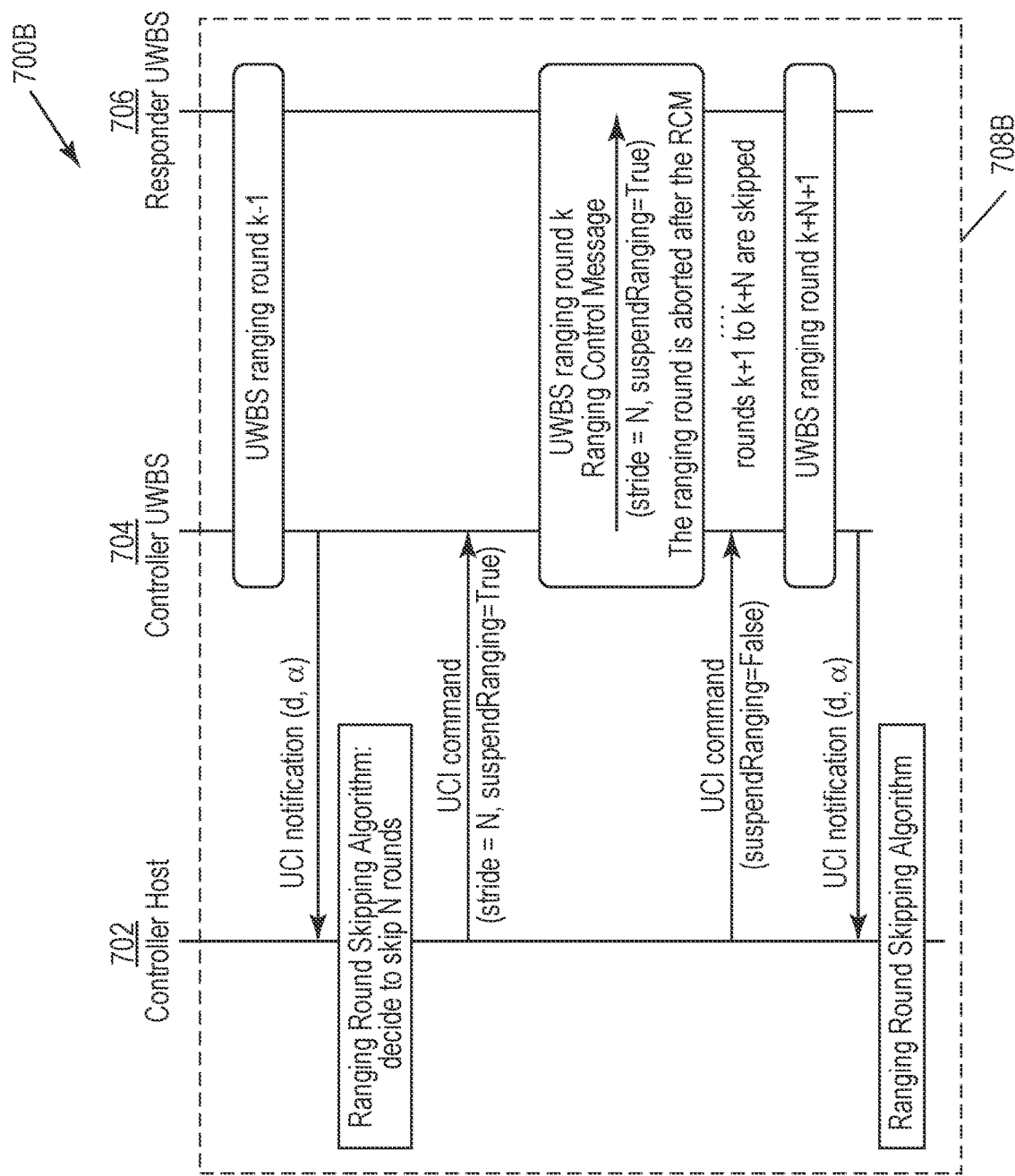
FIG. 8 is a data flow diagram that illustrates communication between a controller host utilizing a ranging round skipping algorithm and a controller UWB-equipped device according to another embodiment of the present disclosure.

FIG. 8 is a data flow diagram 700B that illustrates communication between a controller host utilizing a ranging round skipping algorithm and a controller UWB-equipped device according to another embodiment of the present disclosure. Specifically, this embodiment utilizes a suspendingRanging parameter during ranging rounds 708B. The suspendingRanging parameter, when signaled, indicates whether to suspend ranging.

As an example, by setting suspending Ranging=true (over UWB Command interface), the controller host 702 aborts a ranging round k of the ranging rounds 708B. The RCM control message notifies the responding UWB-equipped device 706 that the current round is aborted. Stride=N notifies the responding UWB-equipped device 706 that the next N rounds are also skipped. Once done, suspendRanging is set at False so that the round k+N+1 can proceed as a regular ranging round.

The embodiment illustrated in FIG. 8 addresses scenarios in which the controller UWB-equipped device 704 (or applications executed by the device 704) is interested in the distance of the responder only in a given range. Therefore, the $2^{nd}$ embodiment predicts an end location or end angle of the responding UWB-equipped device 706 and skips the ranging round while the predicted tuple (d, α) is out the range of interest.

FIG. 9 illustrates a block diagram for a Kalman filter predictive technique for determining an end location or angle for a UWB-equipped device according to some embodiments of the present disclosure. It should be noted that, although FIG. 8 illustrates utilization of a uni-directional Kalman filter in which distance is only measured, the predictive techniques of the present disclosure are not limited to Kalman filters, and the measurements of the present disclosure are not limited to distance. For example, FIG. 8 could be easily generalized to utilize a tuple (d, α) with a multi-dimension Kalman filter.

At step 302, a measurement step is performed. Specifically, a measured value, i.e. measured distance $z_n$ is collected (e.g., as an output of the ranging round), along with a measurement uncertainty, i.e. a ranging noise $r_n$. Generally, this ranging noise $r_n$ is around 10 cm. However, $r_n$ depends on the ranging time (i.e., dual sided or single sided). For example, in DS-TWR $r_n$ is around 10 cm while slightly larger with SS-TWR.

At step 304, an update operation is performed. The update step can be represented as Kalman Gain:

$$K_n = \frac{P_{n,n-1}}{r_n + P_{n,n-1}}$$

Additionally, the distance estimate is updated such that $\widehat{d_{n,n}} = \widehat{d_{n,n-1}} + K_n *(\widehat{d_{n,n-1}} - z_n)$, where $\widehat{d_{n,n-1}} = \widehat{x_{n,n-1}}$ is the estimated distance at t=n−1 and $\widehat{d_{n,n}} = \widehat{x_{n,n}}$ is the estimated distance at t=n. Next, the distance uncertainty is updated such that: $\widehat{p_{n,n}} = (1-K_n)*\widehat{p_{n,n-1}}$, where $\widehat{p_{n,n-1}}$ is the estimated distance uncertainty at t=n−1 and $\widehat{p_{n,n}}$ is the estimated distance uncertainty at t=n.

At step 306, prediction operations are performed. Specifically, predicted uncertainty is predicted such that $\widehat{p_{n+1,n}} = \widehat{p_{n,n}} + \Delta t^2 * \widehat{p_{n,n}^v}$, where $\widehat{p_{n+1,n}}$ is the estimated distance uncertainty at t=n+1, $\widehat{p_{n,n}}$ is the estimated distance uncertainty at t=n, and $p_{n,n_{n,n}}^{\vec{v}}$ is the estimated velocity uncertainty at t=n.

In many cases, the first and second UWB-equipped devices are moving quite slowly. $\widehat{v_{n,n}}$ can be set to the max velocity as a static and predefined value. In another embodiment, $$\widehat{v_{n,n}} = \frac{\widehat{x_{n,n}} - \widehat{x_{n-k,n-k}}}{k * \Delta t}$$

can be estimated as long-term averaged velocity. In such case, $$\widehat{p_{n,n}^{\vec{v}}} = \frac{\widehat{p_{n,n}} + \widehat{p_{n-k,n-k}}}{(k*\Delta t)^2},$$

so that $\widehat{p_{n+1,n}}$ can be approximated as $\widehat{p_{n+1,n}} = \widehat{p_{n,n}}(1+1/k^2) + \widehat{p_{n-k,n-k}} *1/k^2 \approx \widehat{p_{n,n}}(1+2/k^2)$. However, if the second UWB-equipped device highly moving, the concept can be generalized by considering as (d, ḋ) as state vector and use a multi-dimensional Kalman filter.

FIG. 10 is a data flow diagram 700C that illustrates communication between a controller host utilizing a ranging round skipping algorithm and a controller UWB-equipped device that predicts an end location of a responding UWB-equipped device according to yet another embodiment of the present disclosure. To follow the example of FIG. 9, $d_{0,0}$ may be initialized as a $1^{st}$ ranging measurement, while $\widehat{p_{0,0}} = \sim 10$ cm, for a series of ranging rounds 708C. When the RRS algorithm receives a measurement notification over the UWBS-Host interface, it updates the estimated distance $\widehat{d_{n,n}}$ and the $p_{n,n}$ uncertainty and predicts the next distance $\widehat{d_{n,n+1}}$ and the $\widehat{p_{n,n+1}}$ uncertainty. Next, the RRS algorithm checks if the second UWB-equipped device is outside of the range of interest, i.e $\|\widehat{d_{n,n+1}} - D_{upper}\| \gg p_{n,n+1}$ and $\|\widehat{d_{n,n+1}} - D_{lower}\| \gg p_{n,n+1}$, where $D_{upper}$ and $D_{lower}$ are the upper and lower distances of interest. If it is true and if it was true for X−1 preceding rangings, the RSS algorithm determines to skip a next ranging round of the ranging rounds 708C. Accordingly, the next ranging round of the ranging rounds 708C is aborted after the responders are notified via the in-band signaling. Since no measurement is done, there is no need to activate (e.g., wake up) the UWB-equipped device or any applications executed by the device. Meanwhile, the RRS algorithm predicts the position and the position uncertainty at t=2*Δt, which is utilized for the update step at the next measurement of the ranging rounds 708C.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. An Ultra-Wideband (UWB)-equipped device with reduced UWB power consumption, comprising:
   one or more UWB transmitters;
   one or more UWB receivers;
   processing circuitry, wherein the processing circuitry is configured to cause the UWB-equipped device to:
      for a plurality of ranging rounds in accordance with a first ranging time interval:
         send one or more UWB ranging signals to a second UWB-equipped device; and
         receive one or more location measurements from the second UWB-equipped device, wherein a location measurement is indicative of a location of the second UWB-equipped device;
      determine, based on the one or more location measurements across the plurality of ranging rounds, a current location and a predicted end location for the second UWB-equipped device;
      make a determination whether the predicted end location is within a range of interest;
      based on the one or more location measurements across the plurality of ranging rounds, modify the first ranging time interval to a second ranging time interval different than the first ranging time interval, wherein modifying the first ranging time interval comprises modifying, based on the determination, the first ranging time interval to the second ranging time interval different than the first ranging time interval.

2. The UWB-equipped device of claim 1, wherein modifying the first ranging time interval to the second ranging time interval comprises sending, to the second UWB-equipped device, data indicative of instructions to skip one or more of a plurality of subsequent ranging rounds in accordance with the second ranging time interval.

3. The UWB-equipped device of claim 1, wherein modifying the first ranging time interval to the second ranging time interval comprises:
   determining a degree of movement of the second UWB-equipped device based on the one or more location measurements across the plurality of ranging rounds; and
   based on the degree of movement, modifying the first ranging time interval to the second ranging time interval different than the first ranging time interval.

4. The UWB-equipped device of claim 3, wherein:
   the degree of movement is less than a threshold degree of movement; and
   modifying the first ranging time interval to the second ranging time interval comprises modifying the first ranging time interval to the second ranging time interval less than the first ranging time interval.

5. The UWB-equipped device of claim 3, wherein:
   the degree of movement is greater than a threshold degree of movement; and
   modifying the first ranging time interval to the second ranging time interval comprises modifying the first ranging time interval to the second ranging time interval greater than or equal to the first ranging time interval.

6. The UWB-equipped device of claim 1, wherein the processing circuitry is further configured to cause the UWB-equipped device to, for a second plurality of ranging rounds in accordance with the second ranging time interval:
   send one or more second UWB ranging signals to the second UWB-equipped device; and
   receive one or more second location measurements from the second UWB-equipped device.

7. The UWB-equipped device of claim 6, wherein the processing circuitry is further configured to cause the UWB-equipped device to, based on the one or more second location measurements across the second plurality of ranging rounds, modify the second ranging time interval to a third ranging time interval different than the second ranging time interval.

8. The UWB-equipped device of claim 7, wherein the third ranging time interval is equal to the first ranging time interval.

9. The UWB-equipped device of claim 1, wherein making the determination comprises making the determination that the predicted end location is not within the range of interest; and
   wherein modifying the first ranging time interval comprises reducing, based on the determination, the first ranging time interval to a second ranging time interval less than the first ranging time interval.

10. The UWB-equipped device of claim 1, wherein determining the current location and the predicted end location for the second UWB-equipped device comprises generating, using one or more predictive techniques, data indicative of the predicted end location for the second UWB-equipped device based on the respective one or more location measurements.

11. The UWB-equipped device of claim 10, wherein the one or more predictive techniques comprise a Kalman filter.

12. The UWB-equipped device of claim 10, wherein:
the one or more predictive techniques comprise a machine-learned model; and
wherein generating the data indicative of the predicted end location for the second UWB-equipped device comprises processing the one or more location measurements for each of the plurality of ranging rounds and historical device data with the machine-learned model to obtain the data indicative of the predicted end location for the second UWB-equipped device, wherein the historical device data is descriptive of one or more prior sets of location measurements for the second UWB-equipped device.

13. The UWB-equipped device of claim 1, wherein modifying the first ranging time interval comprises, based on the one or more location measurements for each of the plurality of ranging rounds and historical device data, modifying the first ranging time interval to the second ranging time interval different than the first ranging time interval, wherein the historical device data is descriptive of one or more prior sets of location measurements for the second UWB-equipped device.

14. The UWB-equipped device of claim 1, wherein a location measurement comprises one or more of:
a distance between the UWB-equipped device and the second UWB-equipped device;
an angle between the UWB-equipped device and the second UWB-equipped device; or
sensor data from one or more sensors of the second UWB-equipped device that is descriptive of the location of the second UWB-equipped device or movement of the second UWB-equipped device.

15. An Ultra-Wideband (UWB)-equipped device with reduced UWB power consumption, wherein the UWB-equipped device is adapted to:
for a plurality of ranging rounds in accordance with a first ranging time interval:
send one or more UWB ranging signals to a second UWB-equipped device; and
receive one or more location measurements from the second UWB-equipped device, wherein a location measurement is indicative of a location of the second UWB-equipped device;
determine, based on the one or more location measurements across the plurality of ranging rounds, a current location and a predicted end location for the second UWB-equipped device;
make a determination whether the predicted end location is within a range of interest;
based on the one or more location measurements across the plurality of ranging rounds, modify the first ranging time interval to a second ranging time interval different than the first ranging time interval, wherein modifying the first ranging time interval comprises modifying, based on the determination, the first ranging time interval to the second ranging time interval different than the first ranging time interval.

16. A method performed by a first Ultra-Wideband (UWB)-equipped device for reducing UWB power consumption, comprising:
for a plurality of ranging rounds in accordance with a first ranging time interval:
sending one or more UWB ranging signals to a second UWB-equipped device; and
receiving one or more location measurements from the second UWB-equipped device, wherein a location measurement is indicative of a location of the second UWB-equipped device;
determining, based on the one or more location measurements across the plurality of ranging rounds, a current location and a predicted end location for the second UWB-equipped device;
making a determination whether the predicted end location is within a range of interest;
based on the one or more location measurements across the plurality of ranging rounds, modifying the first ranging time interval to a second ranging time interval different than the first ranging time interval, wherein modifying the first ranging time interval comprises modifying, based on the determination, the first ranging time interval to the second ranging time interval different than the first ranging time interval.

17. The method of claim 16, wherein modifying the first ranging time interval to the second ranging time interval comprises sending, to the second UWB-equipped device, data indicative of instructions to skip one or more of a plurality of subsequent ranging rounds in accordance with the second ranging time interval.

18. The method of claim 16, wherein modifying the first ranging time interval to the second ranging time interval comprises:
determining a degree of movement of the second UWB-equipped device based on the one or more location measurements across the plurality of ranging rounds; and
based on the degree of movement, modifying the first ranging time interval to the second ranging time interval different than the first ranging time interval.

19. The method of claim 16, further comprising:
sending one or more second UWB ranging signals to the second UWB-equipped device; and
receiving one or more second location measurements from the second UWB-equipped device.

* * * * *

UNITED STATES PATENT AND TRADEMARK OFFICE
CERTIFICATE OF CORRECTION

| | | |
|---|---|---|
| PATENT NO. | : 12,493,099 B2 | Page 1 of 1 |
| APPLICATION NO. | : 18/158518 | |
| DATED | : December 9, 2025 | |
| INVENTOR(S) | : Eric Perraud | |

It is certified that error appears in the above-identified patent and that said Letters Patent is hereby corrected as shown below:

In the Specification

In Column 10, Line 5, replace "and a represent" with --and α represent--.

Signed and Sealed this
Sixth Day of January, 2026

John A. Squires
*Director of the United States Patent and Trademark Office*